(12) United States Patent
Scharf et al.

(10) Patent No.: US 8,985,621 B2
(45) Date of Patent: Mar. 24, 2015

(54) INTERIOR TRIM PART AND METHOD FOR PRODUCING SAID PART

(71) Applicant: International Automotive Components Group GmbH, Krefeld (DE)

(72) Inventors: Dieter Scharf, Ebersberg (DE); Anna Sasu, Krefeld (DE); Stephan Peters, Krefeld (DE)

(73) Assignee: International Automotive Components Group GmbH, Krefeld (DE)

( * ) Notice: Subject to any disclaimer, the term of this patent is extended or adjusted under 35 U.S.C. 154(b) by 0 days.

(21) Appl. No.: 13/938,698

(22) Filed: Jul. 10, 2013

(65) Prior Publication Data
US 2014/0021703 A1    Jan. 23, 2014

(30) Foreign Application Priority Data

Jul. 11, 2012 (DE) .................... 10 2012 106 238

(51) Int. Cl.
*B60R 21/215* (2011.01)
*B60R 21/2165* (2011.01)
*B32B 7/00* (2006.01)
(Continued)

(52) U.S. Cl.
CPC .............. *B60R 21/2165* (2013.01); *B32B 7/00* (2013.01); *B26D 3/00* (2013.01); *C14B 1/00* (2013.01); *B26D 3/08* (2013.01); *B26F 1/00* (2013.01)
USPC ................................................. 280/728.3

(58) Field of Classification Search
CPC .. B60R 21/203; B60R 21/205; B60R 21/215; B60R 21/2165; B60R 2021/215; B60R 2021/21531; B60R 2021/2165

USPC ........................................ 280/728.3, 731, 732
See application file for complete search history.

(56) References Cited

U.S. PATENT DOCUMENTS 5,533,748 A * 7/1996 Wirt et al. ............... 280/728.3
7,291,301 B2 * 11/2007 Cowelchuk et al. ......... 264/241
(Continued)

FOREIGN PATENT DOCUMENTS

DE        29511172 U1   2/1996
DE        10240439 A1   3/2004
(Continued)

OTHER PUBLICATIONS

European Search Report issued in related EP Appln. No. 13166345 (EP Publn. No. EP2684745), mail dated Sep. 13, 2013 (5 pgs).

*Primary Examiner* — Paul N Dickson
*Assistant Examiner* — Laura Freedman
(74) *Attorney, Agent, or Firm* — Grossman, Tucker, Perreault & Pfleger, PLLC

(57) ABSTRACT

The invention relates to an interior trim part, in particular for a motor vehicle, comprising a base component, a decorative layer made of leather or a leather-like material, and a spacing layer between the base component and the decorative layer, the spacing layer being made of a material that is softer than the material of the base component. The base component, the decorative layer and the spacing layer each have a localized area of weakened material, which allows the interior trim part to break away in a controlled manner when a predefined amount of force is applied to the base component, wherein, at least in the area of weakened material, an intermediate layer lies between the decorative layer and the spacing layer, which intermediate layer does not have a localized weakened area. The invention further provides a method for producing the interior trim part.

24 Claims, 6 Drawing Sheets

Figure 1:
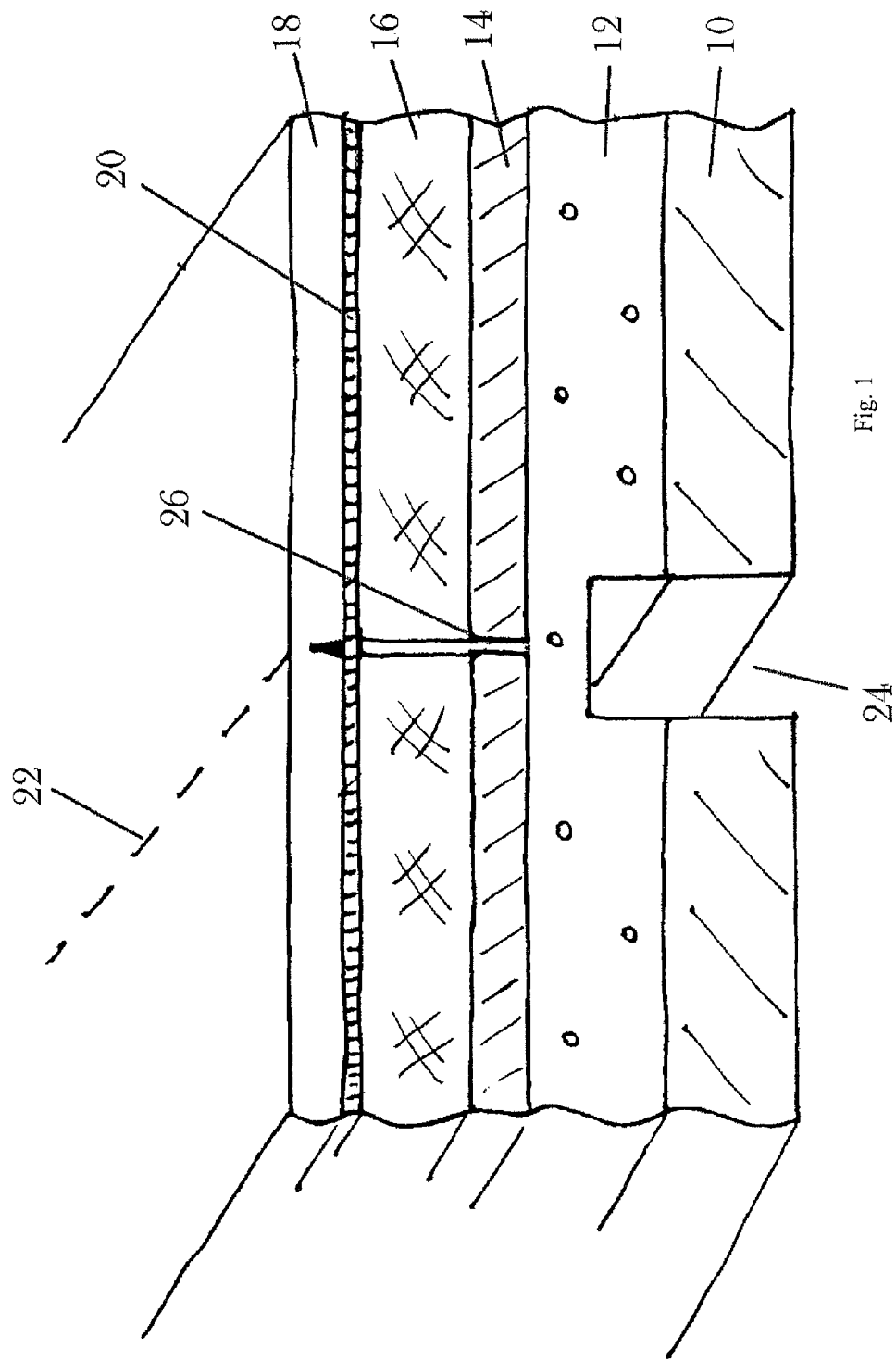

(51) Int. Cl.
  *B26D 3/00* (2006.01)
  *C14B 1/00* (2006.01)
  *B26D 3/08* (2006.01)
  *B26F 1/00* (2006.01)

(56) References Cited

U.S. PATENT DOCUMENTS

| | | | |
|---|---|---|---|
| 7,625,004 B2 * | 12/2009 | Geltinger et al. | 280/728.3 |
| 7,690,677 B2 * | 4/2010 | Cowelchuk et al. | 280/728.3 |
| 7,810,836 B2 | 10/2010 | Müller et al. | |
| 7,900,956 B2 * | 3/2011 | Megliola et al. | 280/728.3 |
| 7,989,052 B2 | 8/2011 | Hehn et al. | |
| 8,132,307 B2 | 3/2012 | Aichner et al. | |
| 2003/0066586 A1 | 4/2003 | Blockhaus et al. | |
| 2007/0218091 A1 | 9/2007 | Gawtrey | |
| 2012/0237712 A1 * | 9/2012 | Thielhorn | 428/43 |

FOREIGN PATENT DOCUMENTS

| | | |
|---|---|---|
| DE | 10244311 A1 | 4/2004 |
| DE | 10 2006 054 590 B3 | 1/2008 |
| DE | 102006054590 B3 * | 1/2008 |
| DE | 10 2006 055 861 B3 | 2/2008 |
| DE | 10 2007 007 635 A1 | 8/2008 |
| DE | 102007017602 A1 | 10/2008 |
| DE | 10 2005 013 477 B4 | 12/2008 |
| DE | 10 2009 008 726 A1 | 10/2009 |
| DE | 102009008726 A1 * | 10/2009 |
| DE | 10 2009 043 498 A1 | 4/2011 |
| DE | 10 2009 054 859 A1 | 6/2011 |
| DE | 102009054859 A1 * | 6/2011 |
| EP | 1 745 089 B1 | 4/2005 |
| EP | 1588906 A1 | 10/2005 |
| EP | 1 980 455 A2 | 3/2008 |
| EP | 1745989 B1 | 3/2008 |
| EP | 1980455 A2 | 10/2008 |
| EP | 2684745 A1 | 1/2014 |
| WO | 973866 A1 | 2/1997 |
| WO | 2008 061600 A1 | 3/2008 |
| WO | 2008044137 A1 | 4/2008 |
| WO | 2011 083032 A1 | 7/2011 |

* cited by examiner

INTERIOR TRIM PART AND METHOD FOR PRODUCING SAID PART

FIELD

The invention relates to an interior trim part, in particular for a motor vehicle, and a method for producing said part.

The invention can be used, for example, in interior trim parts, such as an instrument panel, into which an airbag cover is integrated. The interior trim part comprises a decorative layer made of leather or a leather-like material, such as synthetic leather, Alcantara or a leather composite material. Leather-like materials include materials that are characterized by similar wearing qualities and possible applications to those of real leather. They can be produced, for example, from leather leftovers or scraps, or can also be provided in the form of synthetic leather.

BACKGROUND

From DE 10 2009 008 726 A1 an airbag cover is known, which comprises: a molded part, a visible covering that covers the molded part and is made of leather or a leather-like material, and a foam layer between the molded part and the visible covering. Further, an intermediate layer is inserted between the foam layer and the visible covering, said intermediate layer having a higher modulus of elasticity than the visible covering, for example, a film, a crocheted fabric or a woven fabric. To form a break-away line, a common weakened area is formed through the molded part, the foam layer, and the intermediate layer, whereas the visible covering itself is not weakened and its wall thickness is not decreased, in order to avoid compromising the aesthetic look and feel of the visible covering.

DE 10 2006 055 861 B3 describes an interior trim part for covering an airbag, comprising a base, an intermediate layer made of a knitted spacing fabric, and a surface decorative layer made of leather or synthetic leather. To form a break-away line, base and knitted spacing fabric are perforated completely or otherwise weakened, with the exception of a number of connecting pieces that are left along the break-away line, whereas the surface decoration has no localized weakened areas and also has no seam. Instead, a flat adhesive connection between the surface decoration and the intermediate layer is recessed in a strip extending along the break-away line, in a width of approximately 4 mm.

DE 10 2009 043 498 A1 describes a further interior trim part comprising a base, an intermediate layer and a decorative layer, wherein the base and the intermediate layer are weakened to form a break-away line, however, the decorative layer does not have a weakened area in the region of the break-away line.

In the two documents, the surface decoration made of leather or a leather-like material is itself not weakened, in order to prevent the break-away line from being perceptible from the visible side of the interior trim part. However, in order to ensure that the airbag cover will break away when the airbag deploys, other measures are implemented, such as inserting an intermediate layer or recessing the adhesive layer in the region of the break-away line.

Additional documents are known in the prior art which relate to vehicle interior trims comprising a decorative layer made of leather, wherein, to form a break-away line, the decorative layer is also weakened locally from its bottom side; see, for example, DE 10 2005 013 477 B4, EP 1 980 455 A2, DE 10 2006 054 590 B3, DE 10 2007 007 635 A1, DE 10 2009 054 859 A1 and EP 1 745 089 B1.

SUMMARY

In the production of interior trim parts that are intended for use as airbag covers in motor vehicles, in particular, those comprising a decorative layer made of leather or a leather-like material, which gives the interior trim part a very high-quality appearance, designers are always seeking an optimal compromise between a reliable and controllable breaking away of the airbag cover when the airbag deploys and the best possible look and feel, in which the break-away lines are optically invisible or at least as imperceptible as possible.

The problem addressed by the invention is that of providing an interior trim part and a method for producing said part, which comprises a decorative layer made of leather or a leather-like material and can be used as an airbag cover, wherein the weakening of the interior trim that is necessary for forming the break-away line of the airbag cover should not be optically and haptically perceptible from the outside. This problem is solved by an interior segmentation part according to claim 1 and by a method according to claim 14. Preferred embodiments of the invention are specified in the dependent claims.

The invention provides an interior trim part, in particular for a motor vehicle, such as an instrument panel into which an airbag cover is integrated, said trim part comprising a base component, a decorative layer made of leather or a leather-like material, and a spacing layer between the base component and the decorative layer, said spacing layer being made of a material that is softer than the material of the base component. The base component, the decorative layer and the spacing layer each have a localized area of weakened material, which forms a break-away line and allows the interior trim part to break away in a controlled manner when a predefined force is applied to the base component when an airbag deploys, for example, and strikes against the bottom side of the base component. To prevent this weakened area of material, in particular, the weakened area of material that is formed in the spacing layer, from being optically and/or haptically perceptible from the top side of the decorative layer, an intermediate layer is inserted between the decorative layer and the spacing layer, at least in the area of the break-away line, wherein said intermediate layer has no localized weakened area. The intermediate layer preferably consists of a non-woven fabric, which is produced from individual fibers and itself has only low cohesion—in contrast, for example, to a woven fabric, or a crocheted or knitted fabric made of yarn—and can be easily torn even without its own localized weakened area.

The nonwoven material is formed by a nonwoven fabric, the tearing behavior of which can be similar to that of, for example, a fiber tissue or the like. Possible materials for the nonwoven fabric include thermo(bond) nonwoven fabrics beyond a base weight of approx. 20 g/m²; water jet strengthened nonwoven fabrics beyond a base weight of about approx. 35 g/m²; and needle-punched nonwoven fabrics beyond a base weight of about approx. 60 to approx. 250 g/m². The nonwoven fabrics can be produced from a synthetic fiber material, e.g., from PP, PE, PET, PA, PAN, viscose, etc., or can be mixed fiber nonwoven fabrics, e.g., PP-PE, PP-PET, PET-BicoPET, PET-viscose, etc. Due to the adhesive bonding, for example, PET or mixed nonwoven fabrics are preferred over PP nonwoven fabrics. The thickness of the nonwoven fabric can be in the order of about 0.1 mm to 0.5 mm.

The intermediate layer can be provided as a strip, only in the region of the weakened line or over the entire surface between decorative layer and spacing layer. It conceals the break-away line formed particularly in the spacing layer, so that said line is not optically or haptically perceptible from the outside. This concealment of the weakened area of the spacing layer is particularly relevant in the case of interior trim parts that have already gone through a certain aging process, in which case a gap can form along the weakened area in the spacing layer that forms the break-away line. This is particularly serious when a knitted, crocheted or woven fabric is used, for example, as the spacing layer, which is completely cut through in the region of the weakened line.

Rather than using a nonwoven fabric, it is also conceivable to use a very thin film as the intermediate layer, which can be easily torn.

It is also possible to form the intermediate layer from two or more layers, e.g. from two layers of nonwoven fabric having the same or different properties, from a nonwoven fabric in combination with a foil, or the like. One of the layers could be arranged directly at the bottom side of the leather decorative layer for holding together one or more cuts which can form the weakening. A second layer can be provided directly on the spacing layer, before the decorative layer and the spacing layer are connected.

In one embodiment of the invention, the base component and the spacing layer are bonded together, and in a further embodiment, which will be described in what follows, additional layers can be inserted between base component and spacing layer. If the intermediate layer is provided only in the form of a strip along the break-away line, the spacing layer and the decorative layer can also be bonded directly to one another in the area beyond said strip. Moreover, according to the invention, the spacing layer and the intermediate layer, and the intermediate layer and the decorative layer can also be bonded to one another. Other bonding techniques are also possible.

In the preferred embodiment, the spacing layer comprises a woven, crocheted or knitted spacing fabric. Alternatively, it is also possible for the spacing layer to be embodied as a foam layer, for example.

In one embodiment of the invention, the weakened area of the material of the spacing layer is embodied such that said layer is cut through its entire thickness, at least in sections. For this purpose, it can be cut through completely along the entire break-away line, or connecting pieces can be retained between individual cuts. In another embodiment, the spacing layer can be applied in the form of individual prefabricated inserts.

In one embodiment of the invention, the weakened area of material in the decorative layer is formed by one or more cuts in the bottom side of the decorative layer, wherein these cuts extend through only part of the thickness of the decorative layer, for example, approximately ⅔. In one embodiment, a residual material thickness of 0.4 to 0.5 mm can remain. It is also possible to process the decorative layer by another type of weakening, such as edging or grinding.

In one embodiment of the invention, a foam layer is applied to the base component, on top of which a plastic skin lies, wherein the spacing layer is then applied directly or indirectly to the plastic skin. In this embodiment, the foam layer and the plastic skin should also have a localized area of weakened material in the region of the break-away line. This area of weakened material can be embodied such that the base component and the plastic skin are cut through their entire thickness, at least in areas, while the foam layer is cut through only part of its thickness from the base component side.

The latter stated embodiment is suitable particularly for applications in which the base component has a surface structure, for example, comprising beads and ribs, which does not correspond to the desired surface structure of the interior trim part. The plastic skin can then be embodied, for example, as a slush skin, such that its shape corresponds essentially to the desired surface structure of the interior trim, and the intermediate space between base component and plastic skin can be filled with foam, wherein the foam layer produced in this manner has an uneven thickness over the surface of the interior trim part and compensates for the differences in the surface structures of the base component and the plastic skin.

The spacing layer can be bonded to the plastic skin.

In one embodiment of the invention, an element for stabilizing an edge of the spacing layer can be formed on the plastic skin, in order to prevent the decorative layer, when said layer is placed around an outer edge of the interior trim part, from compressing the spacing layer in this region.

The invention also provides a method for producing an interior trim part, which comprises the following process steps: first, a base component is formed, for example, by injection molding a plastic base or by molding and shaping a fiber composite material. The base component is weakened, for example, by cutting or milling a groove in order to form a break-away line. This groove can cut through the entire thickness of the base component at least in sections. A spacing layer is applied indirectly or directly over the base component, wherein the spacing layer is weakened in the area of the break-away line, in particular, it is cut through in sections or completely. A decorative layer made of leather or a leather-like material is applied to the spacing layer, for example, laminated or bonded thereto, wherein the decorative layer also has a structural weakening in the area of the break-away line. According to the invention, before or during the application of the decorative layer, an intermediate layer, which has no locally weakened area, is inserted at least in the region of the break-away line between the decorative layer and the spacing layer. The intermediate layer can be placed on the spacing layer first, before the decorative layer is laminated on. It is also possible to first bond the intermediate layer to the decorative layer, which is already equipped with the structurally weakened area, and afterward to apply the decorative layer together with the intermediate layer to the spacing layer. It is also possible to use a multi-layer intermediate layer which is sandwiched between the decorative layer and the spacing layer or which, in total or layer by layer, is first connected to the decorative layer and/or the covering layer.

In one embodiment example, in forming the interior trim a plastic skin is also shaped, which corresponds largely to the desired surface structure of the interior trim part. Said skin can be a slush skin, for example. The molded base component and the plastic skin are then placed in a mold, and a cavity formed in the mold between the base component and the plastic skin is filled with a foam material. The plastic skin can be weakened by one or more cuts along the break-away line, and the composite composed of the base component and the foam layer that is formed on the base component can be weakened, for example, by cutting or milling a groove, starting from the base component side. This groove can extend, at least in sections, through the entire thickness of the base component and through a partial thickness of the foam layer. The spacing layer can then be applied to the plastic skin, for example, by bonding.

FIGURES

Figure 2:
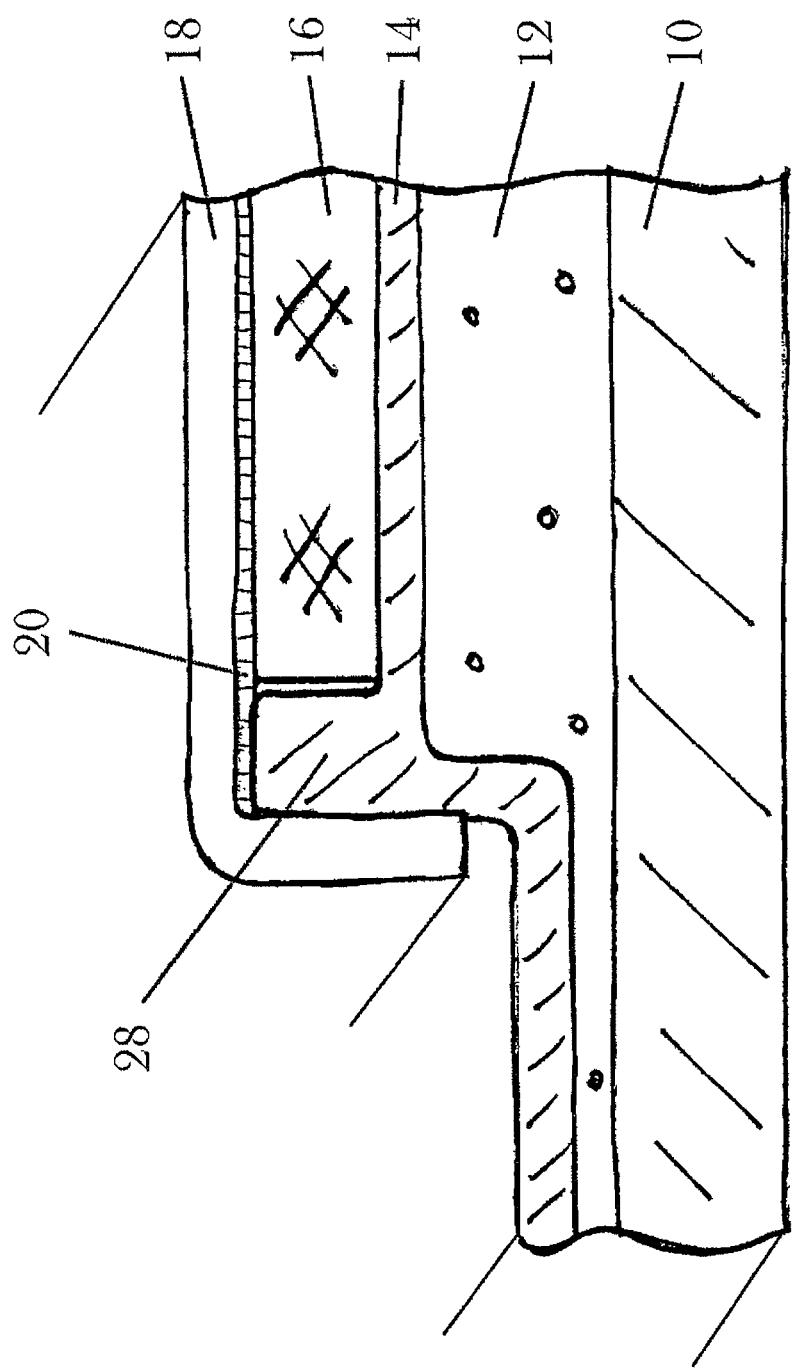
Figure 3:
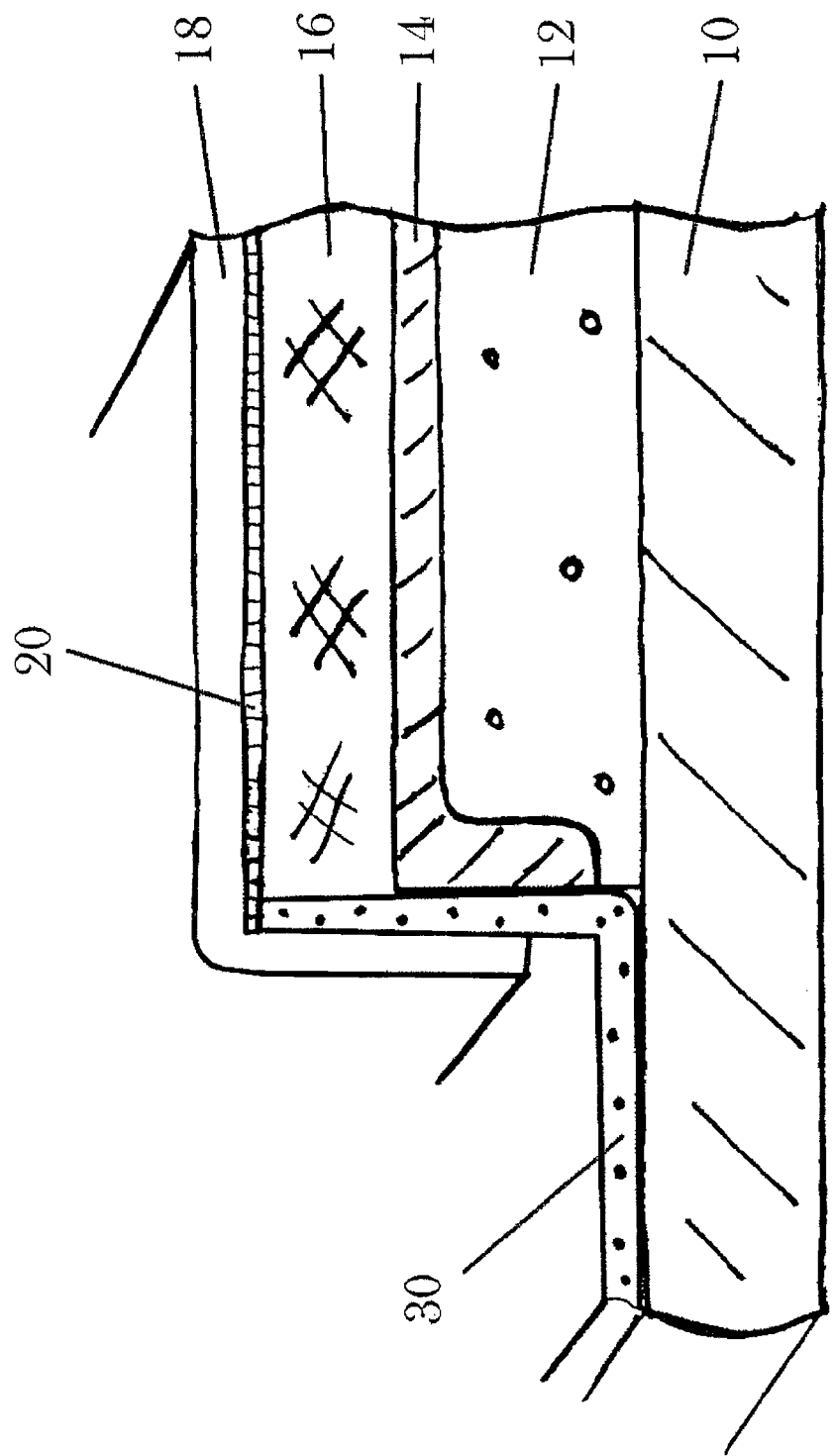
Figure 4:
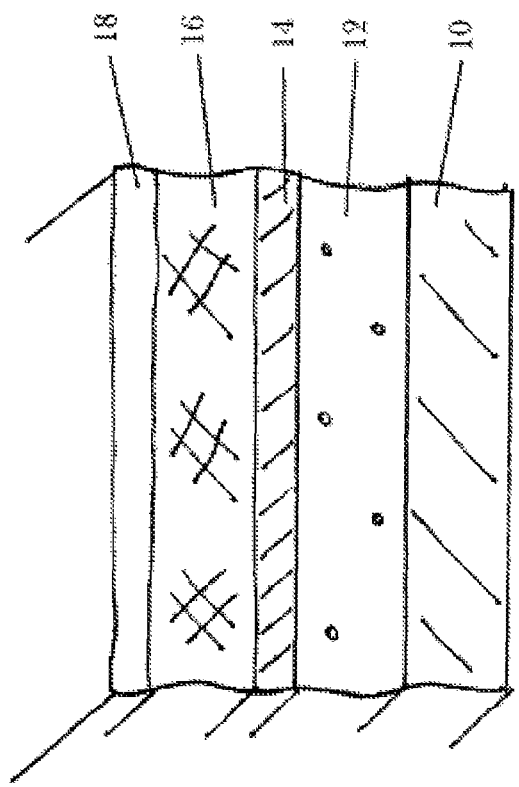
Figure 5:
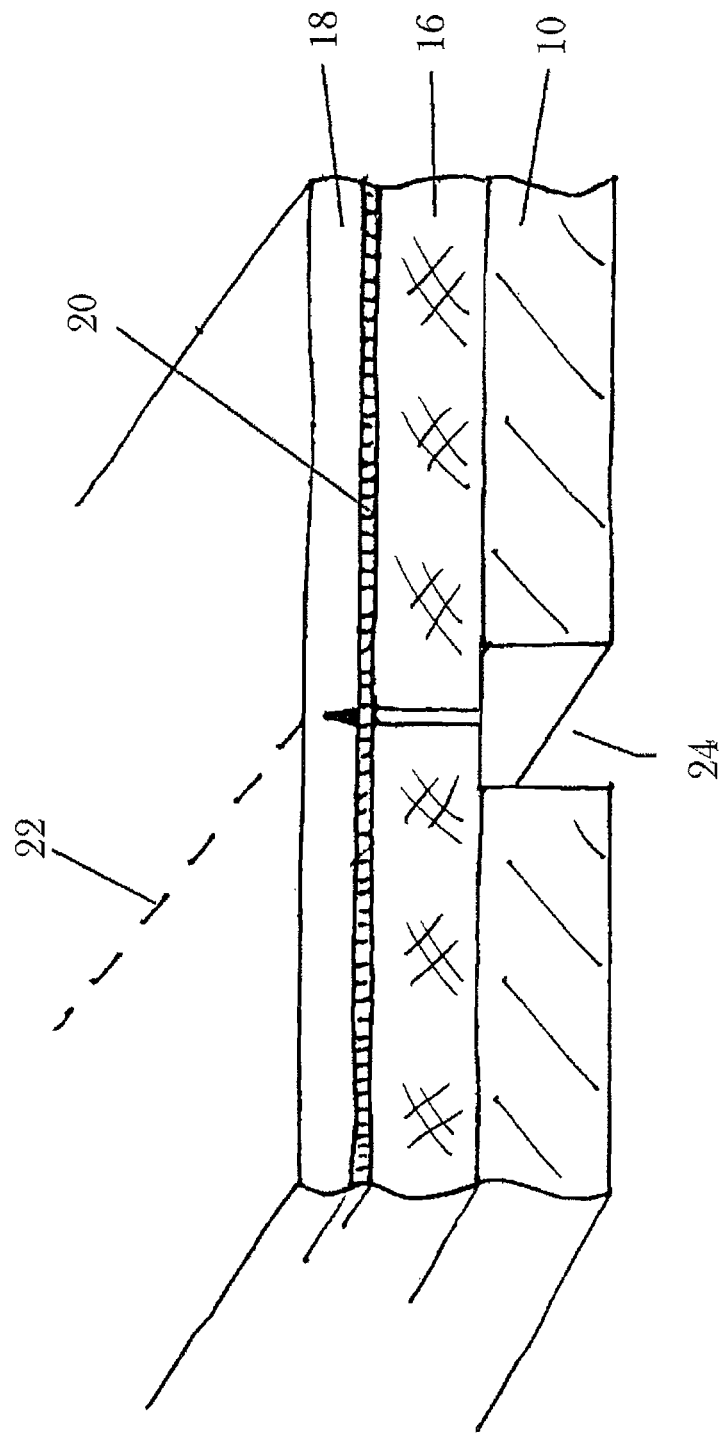
Figure 6:
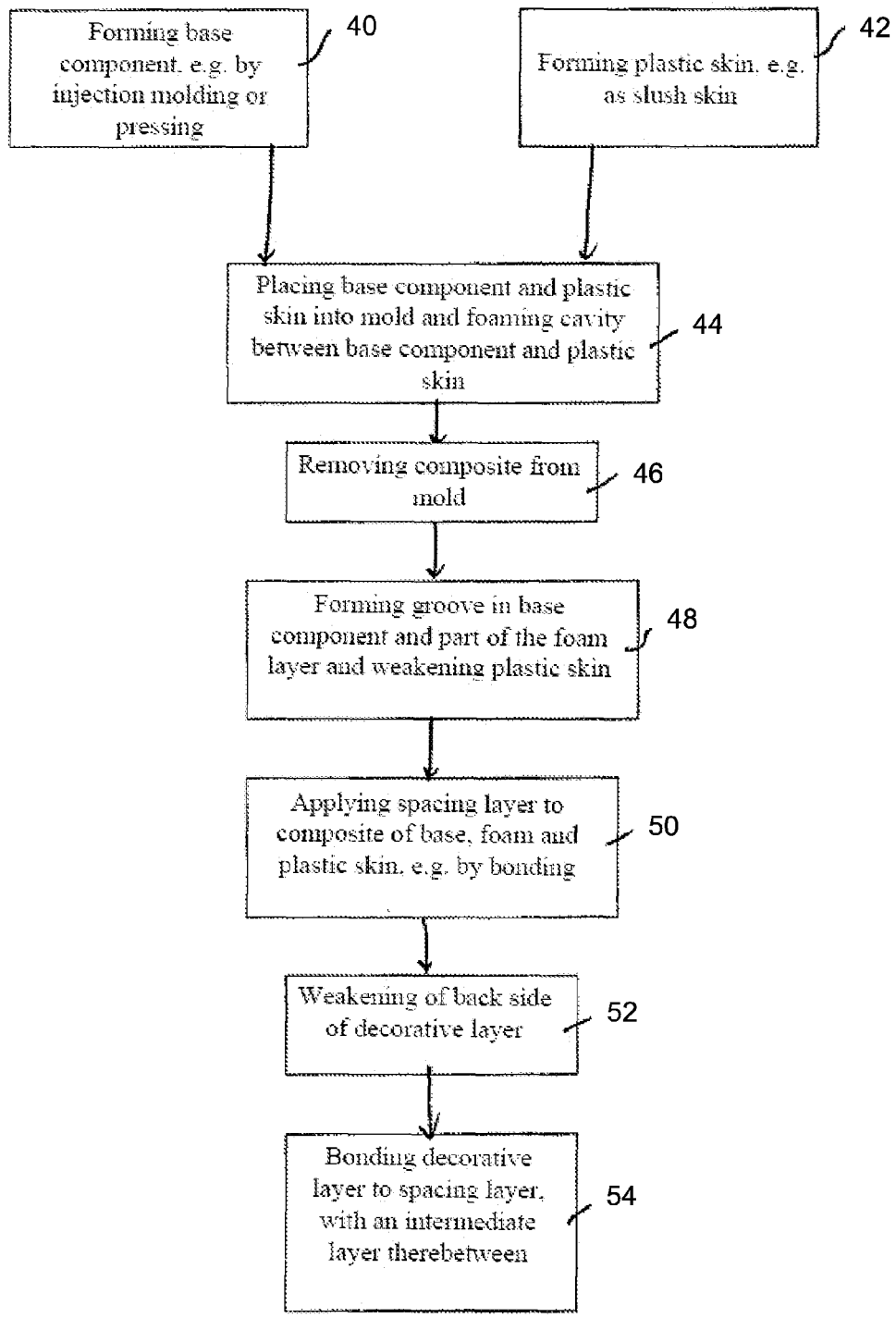

In what follows, the invention will be specified in greater detail on the basis of an embodiment example, with reference to the figures. The figures show:

FIG. 1 a schematic sectional illustration of an interior trim part according to one embodiment of the invention;

FIG. 2 a schematic sectional illustration of an edge region of the interior trim part according to one embodiment of the invention;

FIG. 3 a schematic sectional illustration of an edge region of the instrument panel according to an alternative embodiment;

FIG. 4 a schematic sectional illustration of an instrument panel according to the invention;

FIG. 5 a schematic sectional illustration through an interior trim panel according to a further embodiment of the invention;

FIG. 6 a block diagram illustrating the method according to the invention; and

Figure 7:
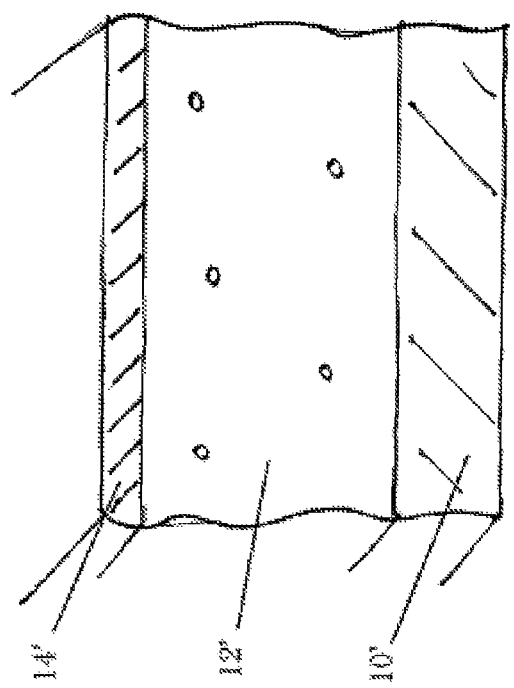

FIG. 7 a schematic sectional illustration of an instrument panel according to the prior art.

DETAILED DESCRIPTION

FIG. 1 shows, in a schematic sectional illustration, one possible construction of the interior trim according to the invention. In this embodiment example, the interior trim comprises a base component 10, a foam layer 12, a plastic skin 14, a spacing layer 16 and a decorative layer 18. Between spacing layer 16 and decorative layer 18, an intermediate layer 20 is inserted.

The base component 10 can be an injection molded part, for example, made of polypropylene, ABS or any other suitable plastic, which optionally contains fibers, for example, glass or carbon fibers. It can also be made from a fiber mat by heating, molding and shaping. Any base material that is suitable for the intended application, for example, as an instrument panel in a motor vehicle, can be used.

The plastic skin 14 is, for example, a slush skin made of PVC, PPO or some other plastic, which is molded separately and in advance. The plastic skin 15 is elastic in relation to the base component. For example, it has a thickness ranging from 0.8 to 1.4 mm. The plastic skin 14 is preferably shaped such that it corresponds largely to the desired surface structure of the interior trim part.

The foam layer 12 that lies between the base component 10 and the plastic skin 14 can be made, for example, of polyurethane (PUR) by filling the space between the base component 10 and the plastic skin 14 with foam. The foam layer 12 can have an uneven thickness over its surface, ranging from 0 to 10 mm, for example, in order to compensate for different surface structures of base component 10 and plastic skin 14. It is therefore possible to shape the plastic skin 14 such that it essentially matches the structure of the visible surface 10 of the interior trim, whereas, independently of this, the base can be formed with beads, ribs and other components, which are not to be perceptible from the visible side. The hardness of the foam layer 12 preferably ranges from 55 Shore A to 75 Shore A.

The spacing layer 16 is adjacent to the plastic skin 14, and can be formed from a knitted, crocheted, or woven fabric, which is bonded to the plastic skin 14.

The cover layer 18 is laminated or bonded to the spacing layer 16. Said cover layer is made of leather or a leather-like material. Leather-like materials include materials that are characterized by similar wearing qualities and possible applications to those of real leather. They can be produced, for example, from leather leftover pieces or scraps, and comprise, e.g., synthetic leather, Alcantara, and leather composite material.

In the embodiment example illustrated, the intermediate layer 20 is inserted at least in the region of a break-away line 22 between cover layer 18 and spacing layer 16. It can be provided as a strip over the break-away line or over the entire surface, or over a greater part of the surface of the interior trim part, e.g., over an entire airbag cover. In one embodiment, the intermediate layer 20 comprises a nonwoven material and is embodied as a nonwoven fabric which is bonded to the spacing layer 14 and the decorative layer 18. In one embodiment example, a thermobond nonwoven fabric having a base weight of 20 g/m² of PET was tested. Nonwoven fabric having a thickness in the range of about 0.1 mm to 0.5 mm has been proven to be suitable in practical implementations, without limiting the invention thereto. Due to the adhesive bond, for example, PET- or mixed nonwovens are preferred over PP nonwovens.

Instead of a single-layer nonwoven fabric, it is also possible to use an intermediate layer 20 made from two or more layers, e.g. from two nonwoven fabrics having the same or different materials and properties, from a nonwoven fabric in combination with foil, or the like.

The break-away line 22 can be produced in the interior trim part illustrated in FIG. 1 as follows: Once the composite comprising base component 10, foam layer 12 and plastic skin 16, has been formed, a groove 24 is milled from the base component 10 side through the base component 10 and part of the foam layer 11, wherein this groove can be embodied as continuous or in sections, with connecting pieces remaining between these sections. The plastic layer 14 is then weakened by a continuous cut or by multiple small cuts or a perforation 26 in the region of the break-away line 22, wherein these cuts can be made by laser cutting, blade cutting, water jet cutting, etc. and can also penetrate into the material of the foam layer 12.

The spacing layer 16 is then applied, wherein this layer can be provided in the form of individual inserts of the woven fabric, crocheted fabric or knitted fabric, i.e., as separate parts that are completely separate from one another, and are arranged, e.g., over the airbag cover and outside of the airbag cover. The spacing layer 16 then no longer needs to be cut, because it is already applied in separated parts.

The decorative layer 18 made of leather or a leather-like material is weakened from its back side along the break-away line before being applied to the interior trim part, for example, it is continuously or discontinuously scored, wherein this weakened area can be embodied, for example, as a straight line, or in the form of a wave, a zig-zag line, etc. In addition to cutting, the weakened area can also be formed, e.g., by edging or grinding. A residual material thickness of 0.45 mm, for example, should be retained.

The intermediate layer 20 can be provided over the entire surface of the spacing layer 16 or only in the region of the break-away line 22, and the decorative layer 18 is laminated onto the spacing layer 16, with the intermediate layer 20 placed between these. When using a multi-layer intermediate layer 20, one of the layers can be applied directly to the bottom side of the leather decorative layer 18 for holding together one or more cuts, the cuts forming the weakening. A second layer can be applied directly to the spacing layer 16, before the decorative layer and the spacing layer are connected.

The intermediate layer 20 ensures that the area of weakened material formed below said layer in the plastic skin 14 and the spacing layer 16 is not perceptible from the decorative side, either optically or haptically. In addition, it also stabilizes the weakening cut in the decorative layer 18 so that even when stretching the leather, e.g. through application of heat or by aging of the leather, the cut is not visible from front side of the decorative layer.

On the other hand, the intermediate layer 20, which does not have its own localized weakened area, is embodied such that the material thereof, when torn along the break-away line 22, easily tears with it and offers no substantial resistance to the breaking open of the interior trim.

In the illustrated embodiment example, the base component can have a thickness in the order of magnitude of, e.g., 1 to 5 mm, especially 2 to 3 mm. In one embodiment example, the thickness of the base component 10 is in the order of magnitude of, e.g. 2.5 mm, but in practice this is naturally dependent on the material and the intended application. The foam layer, as stated above, generally has a varying thickness over the area of the interior trim part, ranging from 0 to, e.g., 8 or 10 mm. The plastic skin 14 can have a thickness in the order of magnitude of 1 mm, and in one embodiment example it is approximately 1.2 mm thick. The spacing layer 16, in turn, has a thickness in the order of magnitude of approximately 1.5 to 5 mm, for example, approximately 3 mm. The decorative layer 18 comprises a leather layer or a leather-like layer having a thickness within the range of, e.g., 0.8 to 1.5 mm, and in one embodiment example said layer is approximately 1.2 mm thick. The intermediate layer 20 has a smaller thickness in the order of magnitude of approximately 0.1 to 0.5 mm FIG. 4 illustrates the structure of the interior trim of FIG. 1 without the intermediate layer 20, as compared with an interior trim of the prior art, shown in FIG. 7, which is composed only of a base component 10', a foam layer 12' and a slush skin 14'. In reference to this conventional construction, shown in FIG. 7, the structure of the interior trim according to the embodiment example of FIG. 1 is also referred to as a minimal skin, wherein with the same basic construction of base component 10, foam layer 12 and plastic skin 14, but with a reduced thickness of the foam layer 12, an interior trim part can be constructed which has an improved, high-quality look, which is achieved by the leather decorative layer 18, and improved haptics as a result of the spacing layer 16. The constructions shown in FIG. 1 and in FIG. 4 can be produced on the basis of the same base structure and plastic skin structure as are used in the conventional construction (shown in FIG. 7). Whereas with the construction on the left in FIG. 4 the plastic skin 14' can form the visible side of the interior trim part, with the construction on the right in FIG. 4, based upon the same base structure, by decreasing the thickness of the foam layer 12, a higher quality construction variant can be achieved, which comprises spacing layer 16 and leather decorative layer 18, which can be added without increasing the total thickness of the structure.

FIG. 2 shows a variant of the interior trim according to the invention, wherein the intermediate layer 20 is applied over the entire surface of the spacing layer 16 between the spacing layer 16 and the decorative layer 18. In the embodiment of FIG. 2, in the edge region of the interior trim, a body 28 is formed on the plastic skin 14, which forms a type of edge protection and ensures that the decorative layer 18, which is placed around the edge of the spacing layer 16, does not compress said spacing layer in this edge region. A clean border can thereby be ensured on the edge of the interior trim or on the transition to an adjacent component (not shown). When the plastic skin 14 is being formed, e.g., as a slush skin, the body 28 can be formed directly with it.

Alternatively, it is also possible, as shown in FIG. 3, to stabilize the edge of the interior trim part or the transition to an adjacent component (not shown) with the help of an insertion component 30. Although this requires an extra working step for insertion of the component 30, it simplifies production of the plastic skin 14. The insertion part 30 can be welded, bonded, snap fit, or otherwise attached to the additional components of the interior trim part.

FIG. 5 shows a schematic sectional illustration of a possible composition of the interior trim part according to a further example. In this example, the interior trim part comprises a base component 10, the spacing layer 16 and the decorative layer 18. Between the spacing layer 16 and the decorative layer 18, an intermediate layer 20 is provided. The same component as in the previous drawings are designated by the same reference numbers and, in general, whatever has been described above, also applies for these components, such as having regard to their materials, thickness, method of manufacture and further properties.

Also with regard to the configuration of the base component 10, the description of the previous figures applies.

In the present example, the spacing layer 16 is applied directly onto the base component 10. It can be made from a woven fabric, or a crocheted or knitted fabric which is adhered to the base component 10. It also can be made from a foam layer.

The spacing layer 16 is laminated onto a cover layer 18 or adhered thereto. It is made from leather or a leather-like material. Having regard to the configuration of the cover or decorative layer 18, anything described above applies.

In the example, the intermediate layer 20 is inserted at least in the area of a break-away line 22, between the cover layer 18 and the spacing layer 16. It can be provided in the form of a strip above the break-away line or over the entire area or over a larger part of the surface of the interior trim part, e.g. over a complete airbag cover. Having regard to the configuration of the interior layer 20, everything said above applies.

The break-away line 22, in the example of the interior trim part shown in FIG. 5, can be manufactured as follows. A groove 24 can be milled into the base component 10 wherein this groove can be embodied as continuous or in sections, with connecting pieces remaining therebetween. Subsequently, the spacing layer 16 is applied wherein it can be provided in the form of individual pieces of the woven fabric, crocheted or knitted fabric, i.e. in the form of distinct, fully separated parts which are arranged above the airbag cover and outside of the airbag cover, for example. In this case, the spacing layer 16 no longer needs to be cut because it is provided in distinct parts.

The decorative layer 18, made from leather or a leather-like material, at its backside, will be weakened along the break-away line before it is attached to the interior trim part; weakening can be performed by continuously or discontinuously slitting or cutting wherein the weakening can be along a straight line, wave-shaped, along a zig-zag line, etc. Instead of cutting, weakening can also be performed by edging or grinding, for example. A residual material thickness of 0.45 mm, for example, should be retained.

The intermediate layer 20 can be provided over the entire surface of the spacing layer 16 or only in the region of the break-away line 22; and the decorative layer 18 is laminated onto the spacing layer 16, with the intermediate layer 20 placed therebetween. When using a multi-layer intermediate layer 20, one of the layers can be applied directly to the bottom side of the leather decorative layer 18 for holding together one or more cuts forming the weakening. A second layer can be connected directly to the spacing layer 16, before the decorative layer and the spacing layer are joined.

In what follows, the individual process steps for producing the interior trim part of FIG. 1 will be specified once again in reference to FIG. 6.

To produce the interior trim part, first the base component 10 is formed, for example, by injection molding or molding a fiber panel, wherein any materials commonly used for this purpose, such as PP, ABS, etc., including fiber parts, natural plastic fiber mats, etc., can be used (cut 40). In parallel, the plastic skin 14 is formed, for example, by a slush-skin molding process that is known in the art. The skin can be made, for example, of PVC or PPO and can have a thickness in the order of magnitude of 0.8 to 1.4 mm (step 42). The base component 10 and the plastic skin 14 are placed in a mold (not shown), wherein the plastic skin can serve as a type of shell for receiving a foam material. The mold is closed, and the cavity between base component and plastic skin is filled with foam, in order to form a composite of base, foam and plastic layer (step 44). In practice, a PUR foam is used, for example, in order to produce a foam layer having a hardness in the order of magnitude of 55 to 75 Shore A.

This composite is removed from the mold (step 46), and to produce the break-away line, a groove is cut, for example, milled, into the base component and a part of the foam layer. The plastic layer can be weakened from the top side thereof, for example, by cutting or scoring, wherein in this case a continuous cut, individual cuts, a perforation, etc., can be chosen (step 48).

The spacing layer 16 is then applied, for example, bonded, to the composite comprising base, foam and plastic skin, wherein this spacing layer is cut through in the region of the break-away line (step 50). A knitted, crocheted, or woven fabric, for example, but also a foam layer can be used as the spacing layer. It is possible to apply individual inserts, produced in advance by punching, to the composite. This can be simpler than applying a continuous spacing layer and then cutting it.

The decorative layer, which has been provided in advance on its back side with a weakened area in the region of the break-away line (step 52) and which is made of leather or a leather-like material, is then laminated to the spacing layer, wherein, in the region of the break-away line, a strip of the intermediate layer 20 is applied. This strip 20 can be bonded in advance to the spacing layer 16 or the decorative layer 18 or, when using a multi-layer intermediate layer 20, is also can be bonded to the spacing layer 16 and the decorative layer 18, or can be bonded to these layers during lamination of the decorative layer 18 to the spacing layer 16.

The interior trim part is thereby completed.

What is claimed is:

1. An interior trim part for a motor vehicle, the interior trim part comprising:
a base component,
a decorative layer made of leather or a leather-like material, and
a spacing layer between the base component and the decorative layer, said spacing layer being made of a material that is softer than a material of the base component,
wherein the base component, the decorative layer and the spacing layer each have a localized area of weakened material, which allows the interior trim part to break away in a controlled manner when a predefined amount of force is applied to the base component, wherein, at least in the area of weakened material, an intermediate layer lies between the decorative layer and the spacing layer, said intermediate layer not having a localized weakened area, and
further comprising a foam layer, which is applied to the base component, and a plastic skin, which lies on the foam layer, wherein the spacing layer is applied to the plastic skin.

2. The interior trim part according to claim 1, wherein the intermediate layer comprises a nonwoven material.

3. The interior trim part according to claim 1, wherein the intermediate layer is arranged in the form of a strip along a weakened line of the decorative layer.

4. The interior trim part according to claim 1, wherein the base component and the spacing layer and/or the spacing layer and the decorative layer and/or the spacing layer and the intermediate layer and/or the intermediate layer and the decorative layer are bonded to one another.

5. The interior trim part according to claim 1, wherein the spacing layer comprises a woven, crocheted or knitted spacer fabric.

6. The interior trim part according to claim 1, wherein the area of weakened material of the spacing layer is embodied such that said spacing layer is cut through its entire thickness at least in sections.

7. The interior trim part according to claim 1, wherein the area of weakened material of the decorative layer is formed by one or more cuts into its bottom side, so that said decorative layer is cut through only a part of its thickness from its bottom side.

8. The interior trim according to claim 1, wherein the foam layer and the plastic skin also have a localized area of weakened material.

9. The interior trim according to claim 8, wherein the areas of weakened material of the base component and of the plastic skin are embodied such that they are cut through their entire thickness, at least in sections, and the area of weakened material of the foam layer is embodied such that said foam layer is cut through only part of its thickness from the base component side.

10. The interior trim part according to claim 1, wherein the spacing layer is bonded to the plastic layer.

11. The interior trim part according to claim 1, wherein a body for stabilizing an edge of the spacing layer is formed on the plastic skin.

12. The interior trim part according to claim 1, which is embodied as an airbag cover in a motor vehicle.

13. An interior trim part for a motor vehicle, the interior trim part comprising:
a base component,
a decorative layer made of leather or a leather-like material, and
a spacing layer between the base component and the decorative layer, said spacing layer being made of a material that is softer than a material of the base component,
wherein the base component, the decorative layer and the spacing layer each have a localized area of weakened material, which allows the interior trim part to break away in a controlled manner when a predefined amount of force is applied to the base component, wherein, at least in the area of weakened material, an intermediate layer lies between the decorative layer and the spacing layer, said intermediate layer not having a localized weakened area, and
wherein the area of weakened material of the spacing layer is embodied such that said spacing layer is cut through its entire thickness at least in sections.

14. The interior trim part according to claim 13, wherein the intermediate layer comprises a nonwoven material.

15. The interior trim part according to claim 13, wherein the intermediate layer is arranged in the form of a strip along a weakened line of the decorative layer.

16. The interior trim part according to claim 13, wherein the base component and the spacing layer and/or the spacing layer and the decorative layer and/or the spacing layer and the intermediate layer and/or the intermediate layer and the decorative layer are bonded to one another.

17. The interior trim part according to claim 13, wherein the spacing layer comprises a woven, crocheted or knitted spacer fabric.

18. The interior trim part according to claim 13, wherein the area of weakened material of the decorative layer is formed by one or more cuts into its bottom side, so that said decorative layer is cut through only a part of its thickness from its bottom side.

19. The interior trim part according to claim 13, further comprising a foam layer, which is applied to the base component, and a plastic skin, which lies on the foam layer, wherein the spacing layer is applied to the plastic skin.

20. The interior trim according to claim 19, wherein the foam layer and the plastic skin also have a localized area of weakened material.

21. The interior trim according to claim 20, wherein the areas of weakened material of the base component and of the plastic skin are embodied such that they are cut through their entire thickness, at least in sections, and the area of weakened material of the foam layer is embodied such that said foam layer is cut through only part of its thickness from the base component side.

22. The interior trim part according to claim 19, wherein the spacing layer is bonded to the plastic layer.

23. The interior trim part according to claim 19, wherein a body for stabilizing an edge of the spacing layer is formed on the plastic skin.

24. The interior trim part according to claim 13, which is embodied as an airbag cover in a motor vehicle.

* * * * *

UNITED STATES PATENT AND TRADEMARK OFFICE
CERTIFICATE OF CORRECTION

PATENT NO. : 8,985,621 B2  
APPLICATION NO. : 13/938698  
DATED : March 24, 2015  
INVENTOR(S) : Dieter Scharf et al.

Page 1 of 1

It is certified that error appears in the above-identified patent and that said Letters Patent is hereby corrected as shown below:

In the Claims:

In column 10, line 28, in Claim 8, after "trim" insert -- part --.

In column 10, line 31, in Claim 9, after "trim" insert -- part --.

In column 12, line 1, in Claim 20, after "trim" insert -- part --.

In column 12, line 4, in Claim 21, after "trim" insert -- part --.

Signed and Sealed this  
Fourteenth Day of July, 2015

Michelle K. Lee  
*Director of the United States Patent and Trademark Office*